(12) United States Patent
Xu et al.

(10) Patent No.: US 11,650,113 B2
(45) Date of Patent: May 16, 2023

(54) TORQUE SENSOR AND STRAIN BEAM STRUCTURE OF THE SAME

(71) Applicant: SONGNUOMENG TECHNOLOGY CO., LTD., Hunan (CN)

(72) Inventors: Chengyi Xu, Hunan (CN); Weiwu Lei, Hunan (CN); Yongnian Liu, Hunan (CN); Jianbo Zhang, Hunan (CN); Sufu Liu, Hunan (CN)

(73) Assignee: SONGNUOMENG TECHNOLOGY CO., LTD., Hunan (CN)

( * ) Notice: Subject to any disclaimer, the term of this patent is extended or adjusted under 35 U.S.C. 154(b) by 218 days.

(21) Appl. No.: 17/325,924

(22) Filed: May 20, 2021

(65) Prior Publication Data
US 2022/0236125 A1     Jul. 28, 2022

(30) Foreign Application Priority Data

Jan. 26, 2021    (CN) .......................... 202110114546.X

(51) Int. Cl.
*G01L 3/10*     (2006.01)

(52) U.S. Cl.
CPC .................................. *G01L 3/108* (2013.01)

(58) Field of Classification Search
CPC .......... G01L 3/108; G01L 5/0042; G01L 1/04
See application file for complete search history.

(56) References Cited

U.S. PATENT DOCUMENTS

| | | | |
|---|---|---|---|
| 6,269,702 B1* | 8/2001 | Lambson | G01L 3/108 |
| | | | 73/862.045 |
| 6,871,552 B2* | 3/2005 | Liu | G01L 1/22 |
| | | | 73/862.041 |
| 8,726,741 B2* | 5/2014 | Krippner | G01L 3/1457 |
| | | | 73/862.041 |
| 9,250,146 B2* | 2/2016 | Krans | G01L 1/205 |
| 9,869,597 B1* | 1/2018 | Reich | G01L 5/1627 |
| 10,422,707 B2* | 9/2019 | Bradford | B25J 13/085 |
| 11,085,838 B2* | 8/2021 | Glusiec | G01L 1/26 |
| 11,287,335 B2* | 3/2022 | Mukai | G01L 3/00 |
| 2002/0178841 A1* | 12/2002 | Kobayashi | G01G 3/141 |
| | | | 73/862.629 |
| 2019/0064015 A1* | 2/2019 | Wang | G01L 3/10 |
| 2019/0275681 A1* | 9/2019 | Böhme | B25J 13/085 |
| 2020/0370978 A1* | 11/2020 | Yokoyama | G01L 3/108 |
| 2021/0404890 A1* | 12/2021 | Kosaka | G01L 1/2262 |

* cited by examiner

*Primary Examiner* — Freddie Kirkland, III

(57) ABSTRACT

A torque-sensor strain beam structure and a torque sensor are provided. The torque-sensor strain beam structure comprises an external ring, a connecting hub and at least two strain beams. The external ring has a first joint. The connecting hub is located in the external ring and arranged coaxially with the external ring. The connecting hub has a second joint. A first end of each of the at least two strain beams is fixedly connected to an inner wall of the external ring and a second end of each of the at least two strain beams is fixedly connected to the connecting hub. A strain grid is provided on each of the at least two strain beams. A load inputting point is located at the first joint or the second joint. Arrangement of the torque-sensor strain beam structure allows the torque sensor to have smaller volume while having higher measurement sensitivity.

20 Claims, 13 Drawing Sheets

TORQUE SENSOR AND STRAIN BEAM STRUCTURE OF THE SAME

CROSS REFERENCE TO RELATED APPLICATION

This disclosure claims the priority and benefit of Chinese Patent Application No. 202110114546.X entitled "Torque Sensor and Strain beam Structure of the same" filed with the Chinese Patent Office on Jan. 26, 2021, which is incorporated herein by reference in its entirety.

TECHNICAL FIELD

The present disclosure relates to the technical field of torque sensors, in particular to a torque sensor and a strain beam structure of the same.

BACKGROUND ART

As a torque detection device, a torque sensor can be used in applications that require precision measurement of force or torque, such as robot joints, medical equipment, and military equipment. Most of traditional torque sensors detect strain information on a strain beam through a strain grid provided on the strain beam, and then obtain a torque value through the strain information. However, a strain beam structure of the traditional torque sensor is restricted by layout space, which has a greater impact on detection sensitivity. Therefore, for some applications with high sensitivity requirements, the traditional torque sensor is difficult to meet measurement requirements.

SUMMARY

Based on the above, with respect to a problem of low measurement sensitivity of a traditional torque sensor, it is necessary to provide a torque-sensor strain beam structure and a torque sensor that can improve measurement sensitivity of the torque sensor.

In a preferred embodiment of the present disclosure, it is provided a torque-sensor strain beam structure, including an annular external ring, a connecting hub configured symmetrically about a geometric center thereof, and at least two strain beams.

The external ring has a first joint.

The connecting hub is located in the external ring and arranged coaxially with the external ring; the connecting hub is provided a second joint.

A first end of each of the at least two strain beams is fixedly connected to an inner wall of the external ring and a second end of each of the at least two strain beams is fixed connected to the connecting hub. The at least two strain beams include an even number of strain beams. The at least two strain beams are arranged symmetrically relative to a center of the external ring. Each of the at least two strain beams is provided with a strain grid. The strain grid is configured to detect strain information on a corresponding strain beam where the strain gate is provided. A load inputting point on the torque-sensor strain beam structure is located at the first joint or the second joint. When the load inputting point is located at the first joint, a transmission path of a load transmitted from the first joint to a position on each strain beam where the strain grid is provided is non-linear. When the load inputting point is located at the second joint, a transmission path of a load transmitted from the second joint to a position on each strain beam where the strain grid is provided is non-linear.

In some embodiments, a length of each of the at least two strain beams is greater than a width thereof. A thickness of each of the at least two strain beams is less than a thickness of the external ring and a thickness of the connecting hub, respectively.

In some embodiments, the connecting hub includes a connecting portion and two acting portions. The connecting portion is connected between the two acting portions so that the connecting hub has an elongated plate-like structure. The second joint is located at ends of the acting portions away from the connecting portion. The second end of each of the at least two strain beams is fixedly connected to a side wall of the connecting portion.

In some embodiments, two opposite sides of the connecting portion are both arc-shaped surfaces protruding outward. One end of each of the at least two strain beams away from the inner wall of the external ring is connected to a corresponding arc-shaped surface.

In some embodiments, each of the at least two strain beams includes a first strain plate and a second strain plate connected to one end of the first strain plate. An extending direction of the first strain plate is intersected with an extending direction of the second strain plate. The strain grid is arranged on a surface of the first strain plate or a surface of the second strain plate.

One of the first strain plate and the second strain plate is fixedly connected to the inner wall of the external ring, and another of the first strain plate and the second strain plate is fixedly connected to the connecting hub.

In some embodiments, a width of the first strain plate is greater than a width of the second strain plate. The strain grid is arranged on the surface of the second strain plate.

In some embodiments, there are two second strain plates, and the two second strain plates are arranged in parallel and spaced apart. Each of the second strain plates is provided with the strain grid; and/or the first strain plate extends along a non-linear direction in a plane perpendicular to a central axis of the external ring.

In some embodiments, each of the second strain plates includes a horizontal plate and two vertical plates, and one of the two vertical plates is connected to a first end of the horizontal plate and another of the two vertical plates is connected to a second end of the horizontal plate. An extending direction of each of the two vertical plates is intersected with an extending direction of the horizontal plate. The first strain plate is fixedly connected with a side of the horizontal plate away from the two vertical plates. A width of the horizontal plate is smaller than a width of each of the two vertical plates and a width of the first strain plate. The strain grid is arranged on the surface of the horizontal plate.

In some embodiments, the first strain plate is located at a middle portion of the horizontal plate. The horizontal plate is provided with the strain grid at portions of the horizontal plate located at both sides of the first strain plate.

In some embodiments, each of the at least two strain beams is an elongated plate-like structure. The first joint is arranged in a staggered manner with respect to positions where the at least two strain beams are connected to the external ring. The second joint is arranged in a staggered manner with respect to positions where the at least two strain beams are connected to the connecting hub.

In some embodiments, the width of each of the at least two torques is decreased gradually along a direction in which the connecting hub points to the external ring. The strain grid is arranged on a surface of one end of each of the at least two strain beams close to the external ring.

In some embodiments, the torque-sensor strain beam structure further includes a transition plate connected to the inner wall of the external ring. A width of the transition plate is gradually decreased along a direction in which the inner wall of the external ring pints to the connecting hub. The first end of each of the at least two strain beams is connected with an inclined surface of the transition plate.

In some embodiments, the transition plate is an elongated curved plate. Both ends of the transition plate are fixedly connected to the inner wall of the external ring. The transition plate extends along a trapezoidal contour curve.

In some embodiments, a cross section of each of the at least two strain beams is rectangular, T-shaped, H-shaped or U-shaped; or the at least two strain beams are made of martensitic precipitation-hardening stainless steel; or the strain grid is a thin film strain grid directly formed on the surface of each of the at least two strain beams by a vacuum ion beam sputtering technology.

In another preferred embodiment of the present disclosure, it is provided a torque-sensor strain beam structure. It includes a first connecting plate and a second connecting plate superposed with the first connecting plate. The first connecting plate has a first joint. The second connecting plate includes a fixing plate, four strain beams, and two opposite acting plates spaced apart; the strain beams, the acting plates, and the fixing plate are located in a same plane. The fixing plate is located between the two acting plates. Each of the two opposite acting plates is fixedly connected to the fixing plate through two corresponding strain beams. The four strain beams are arranged symmetrically relative to a geometric center of the fixing plate, so that the four strain beams are configured in an X-shaped arrangement. The acting plates have a second joint. The fixed plate is fixedly connected to the first connecting plate. A strain grid is provided on a side surface of each of the four strain beams. The strain grid is used to detect strain information on a corresponding strain beam in real time. When a load inputting point on the torque-sensor strain beam structure is located at the first joint, a transmission path of a load transmitted from the first joint to a position on each strain beam where the strain grid is provided is non-linear.

In some embodiments, the first connecting plate is an elongated plate-like structure. The fixing plate is fixedly connected to a middle portion of the first connecting plate. An extending direction of the first connecting plate is intersected with a direction in which the fixing plate points to the acting plates. The first joint is located at an end of the first connecting plate away from the fixing plate.

In some embodiments, a thickness of each of the strain beams is greater than a width thereof; the strain grid is located on a plane of each of the strain beams parallel to a thickness direction of each of the strain beams; or A cross section of each of the strain beams perpendicular to a length direction thereof is rectangular, T-shaped, H-shaped or U-shaped; or The first connecting plate and the second connecting plate are made of martensitic precipitation-hardening stainless steel.

The strain grid is a thin film strain grid directly formed on a surface of each of the strain beams by a vacuum ion beam sputtering technology.

It is provided a torque sensor including the torque-sensor strain beam structure as described above.

With respect to the above torque-sensor strain beam structure and the torque sensor, in actual application, because transmission paths of a load transmitted from a load inputting point to a positions on strain beams where strain grids are provided are non-linear, transmission lengths of the load transmitted from the load inputting point to the positions on the strain beams where the strain grids are provided are longer; even if a small rotating load is applied at the load inputting point, a larger amount of strain will occur in the position on each of the strain beams where the strain grid is provided, thereby facilitating the strain girds to collect strain information. Therefore, the torque sensor strain beam structure enables the torque sensor to have a smaller volume while having higher measurement sensitivity.

Figure 1:
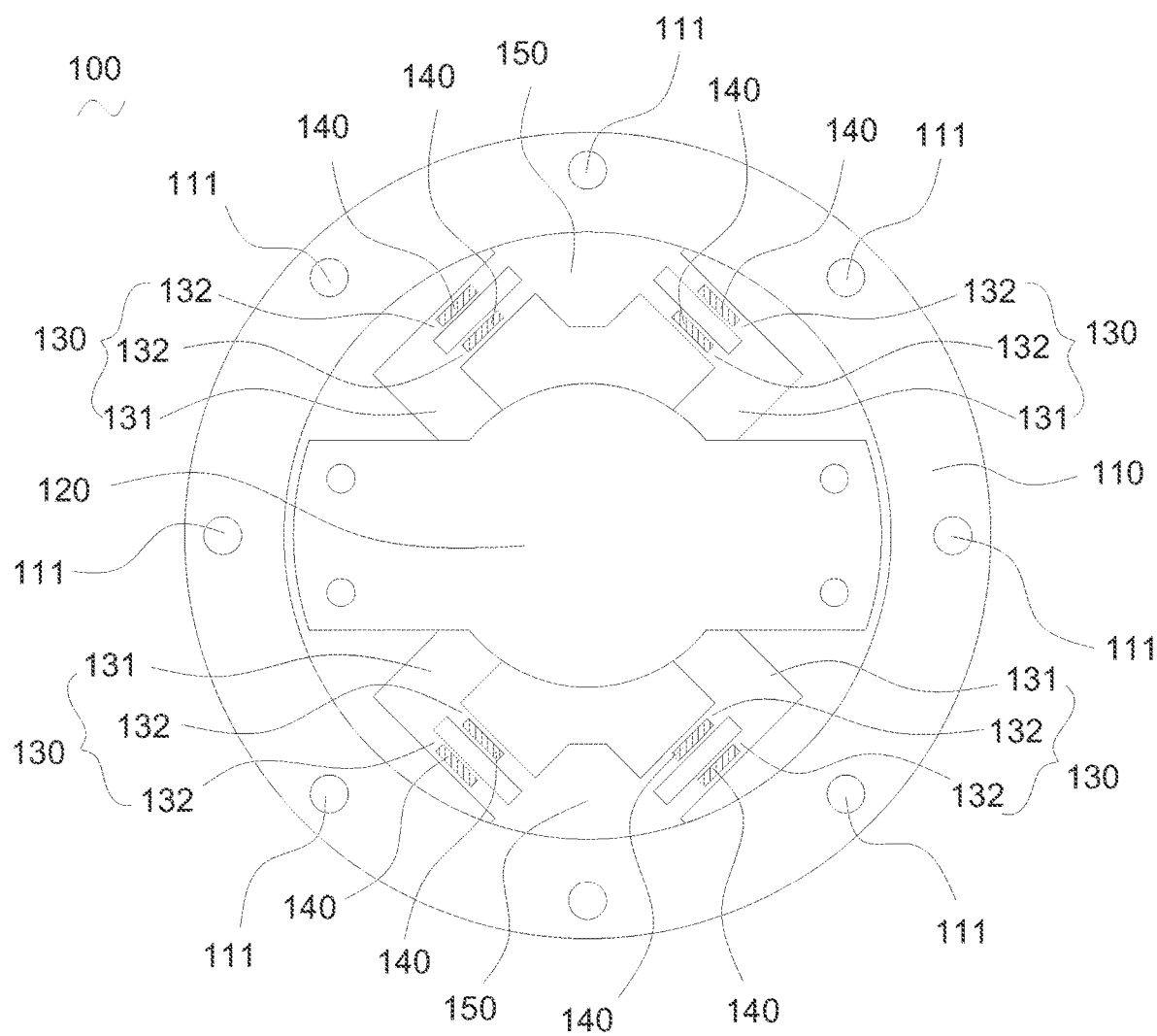
FIG. 1 is a structural schematic diagram of a torque-sensor strain beam structure according to Embodiment 1 of the present disclosure.

List of reference numbers: 100 torque-sensor strain beam structure; 110 external ring; 111 first joint; 120 connecting hub; 121 second joint; 122 connecting portion; 1221 arc-shaped surface; 123 acting portion; 130 strain beam; 131 first strain plate; 132 second strain plate; 1321 horizontal plate; 1322 vertical plate; 140 strain grid; 150 transition plate; 160 first connecting plate; 170 second connecting plate; 171 fixing plate; 172 acting plate.

DETAILED DESCRIPTION OF THE EMBODIMENTS

In order to facilitate understanding of the present disclosure, the present disclosure will be described in more detail below with reference to the relevant drawings. The preferred embodiments of the present disclosure are shown in the accompanying drawings. However, the present disclosure can be implemented in many different ways and is not limited to the embodiments described herein. Instead, these embodiments are provided to help understand the present disclosure more thoroughly and comprehensively.

Unless otherwise defined, all technical and scientific terms used herein have the same meanings as commonly understood by those skilled in the technical field involved in the present disclosure. The terms used in the description of the present disclosure are only for describing specific embodiments, and are not intended to limit the present disclosure. The term "and/or" as used herein includes any and all combinations of one or more objects listed.

Upon describing positional relationship, unless otherwise specified, when an element is referred to as being "on" another element, it can be directly on other elements or there may be intervening elements. It will also be understood that when an element is referred to as being "between" two elements, it can be the only one between the two elements, or there may be one or more intervening elements.

With respect to "comprising", "having", and "including" described herein, unless a clear definitive term is used, such as "only", "consisting of", another component may be added. Unless mentioned to the contrary, a term in a singular form may include a plural form, and it cannot be understood as one.

As described in the background art, a torque sensor detects strain information of a strain beam through a strain grid provided on the strain beam, and then obtains a torque value through the strain information. However, a strain beam structure of the traditional torque sensor is restricted by layout space, which has a great impact on detection sensitivity. To improve the detection sensitivity, many existing technologies increase a volume of the strain beam structure. Therefore, for the traditional torque sensor, there is a contradiction between detection sensitivity and volume.

Based on the above reasons, the present disclosure provides a torque-sensor strain beam structure and a torque sensor, in which the torque sensor includes a torque-sensor strain beam structure. FIG. 1 to FIG. 10 are structural schematic diagrams of the torque-sensor strain beam structures in Embodiment 1 to Embodiment 10, respectively. For ease of description, FIG. 1 to FIG. 10 only show structures related to the embodiments of the present disclosure.

Referring to FIG. 1 to FIG. 9, the torque-sensor strain beam structure 100 in a preferred embodiment of the present disclosure includes an annular external ring 110, a connecting hub 120 and at least two strain beams 130.

The external ring 110 has a first joint 111. Specifically, the external ring 110 has an annular plate-like structure. There may be one or more first joints 111. When there are multiple first joints 111, the multiple first joints 111 are arranged at intervals along a circumferential direction of the external ring 110. It should be noted that the first joint 111 can be a connection structure such as a connection hole, a slot and a boss, provided on the external ring 110 and configured for installing a member to be detected' or can be one virtual installation position or area configured to install a member to be detected.

Figure 11:
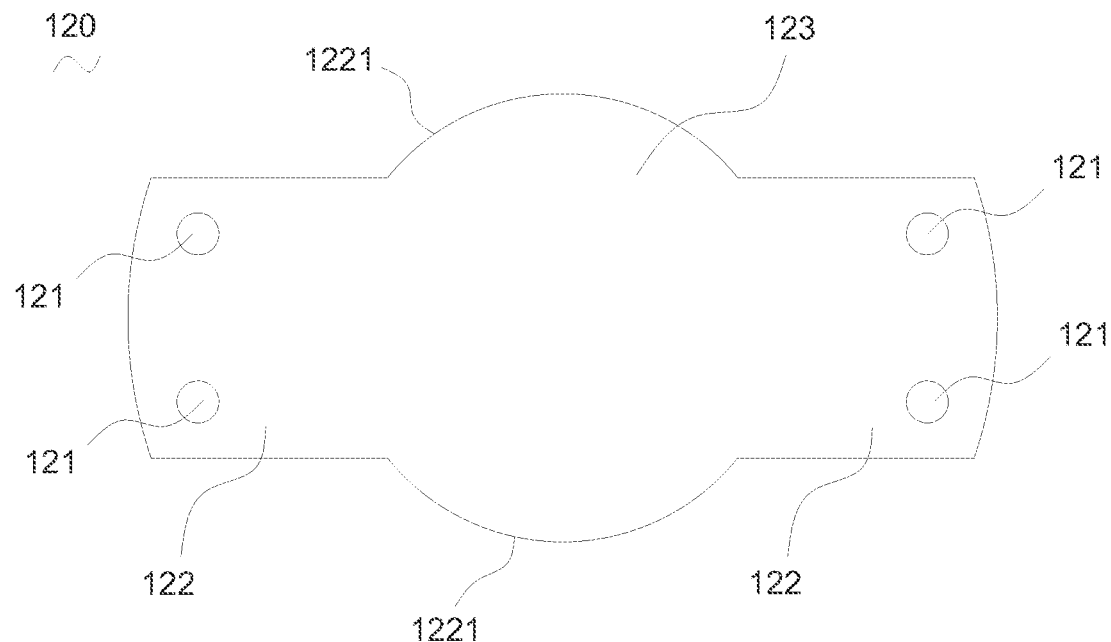
FIG. 11 are structural schematic diagrams of connecting hub s in the torque-sensor strain beam structures respectively shown in FIG. 1, FIG. 3, and FIG. 5 to FIG. 9.
Figure 12A:
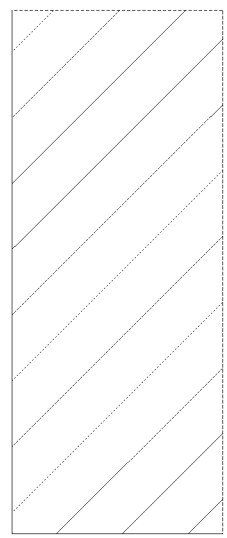
FIG. 12a to FIG. 12d show cross-sectional views of the strain beams in the torque-sensor strain beam structures shown in FIG. 1 to FIG. 10.
Figure 12B:
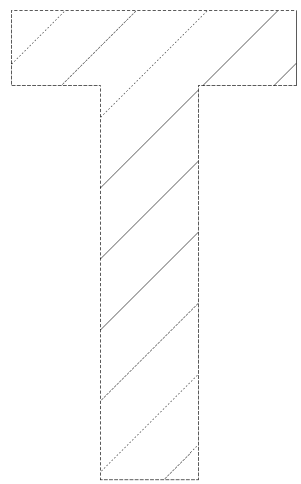
Figure 12C:
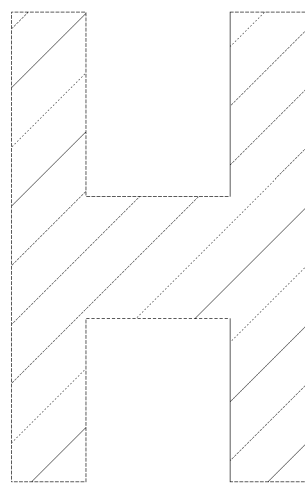
Figure 12D:
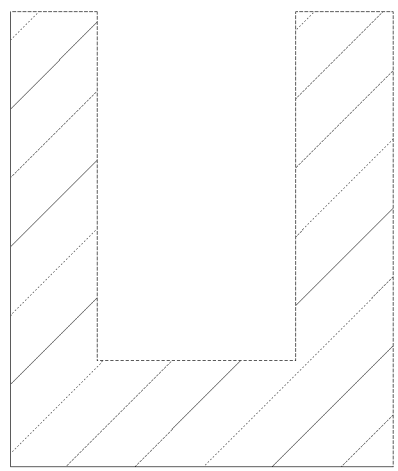

Referring to FIG. 11, the connecting hub 120 is a structure arranged symmetrically about a geometric center thereof. The connecting hub 120 is located in the external ring 110 and is arranged coaxially with the external ring 110. Specifically, the connecting hub 120 and the external ring 110 are located in a same plane. The connecting hub 120 has a second joint 121. It should be noted that the second joints 121 may be a connection structure such as a connection hole, a slot and a boss, provided on the connecting hub 120 and configured to install a member to be detected, or it can be one virtual installation position or area formed on the connecting hub 120 and configured to install a member to be detected.

Referring to FIG. 1 to FIG. 10 again, two ends of each strain beam 130 are respectively fixedly connected to an inner wall of the external ring 110 and to the connecting hub 120. The at least two strain beams 130 include an even number of strain beams. The at least two strain beams 130 are arranged symmetrically with respect to a center of the external ring 110. Therefore, the connecting hub 120 is fixedly connected to the external ring 110 through the at least two strain beams 130. The strain beams 130 may be fixedly connected to the external ring 110 and the connecting hub 120 by welding, screwing, riveting, etc., or may be integrally formed with the external ring 110 and the connecting hub 120, respectively.

Specifically, the strain beams 130 are made of martensitic precipitation-hardening stainless steel to improve fatigue and corrosion resistance of the strain beams 130 and efficiently prolong service life of the strain beams 130, and thus the service life of the torque sensor is prolonged.

Referring to FIG. 12a, FIG. 12b, FIG. 12c, and FIG. 12d together, specifically, a cross section of each of the at least two strain beams 130 is rectangular, T-shaped, H-shaped, or U-shaped. Furthermore, the cross section of each of the strain beams 130 is a cross section perpendicular to a length direction thereof. Configuring the cross sections of the strain beams 130 to be rectangular, T-shaped, H-shaped or U-shaped is beneficial to concentration of stress on the strain beams 130.

In some embodiments, the cross section of each of the strain beams 130 can also be other shapes that are conducive to stress concentration.

Referring to FIG. 1 to FIG. 11 again, each of the strain beams 130 is provided with a strain grid 140. The strain grid 140 is configured to detect strain information on a corresponding strain beam 130. Furthermore, each of the strain beams 130 may be provided with one strain grid 140 or multiple strain grids 140. When multiple strain grids 140 are provided on each of the strain beams 130, the number of strain grids 140 on each of the strain beams 130 is the same. In the torque sensor, a torque value of a member to be detected is obtained through the strain information.

Specifically, the strain grid 140 is a thin film strain grid 140 directly formed on a surface of each of the strain beams 130 by a vacuum ion beam sputtering technology. Thus, through the vacuum ion beam sputtering technology, a bonding force between the strain grids 140 and the strain beams 130 is greatly enhanced, a probability of the strain grid 140 being separated from each of the strain beams 130 is reduced, and the service life of the torque sensor is effectively prolonged.

A load inputting point of the torque-sensor strain beam structure 100 is located at the first joint 111 or the second joint 121. Specifically, when the first joint 111 is used as the load inputting point, the second joint 121 is fixedly arranged. When a rotating load is input to the first joint 111, the external ring 110 tends to rotate relative to the connecting hub 120, strain may take place on the strain beams 130. When the second joint 121 is used as a load inputting point, the first joint 111 is fixedly arranged. When the rotating load is input to the second joint 121, the connecting hub 120 tends to rotate relative to the external ring 110, a strain may take place on the strain beams 130.

When the load inputting point is located at the first joint 111, transmission paths of the load transmitted from the first joint 111 to positions on strain beams 130 where the strain grids 140 are provided are non-linear. When the load inputting point is located at the second joint 121, transmission paths of a load transmitted from the second joints 121 to positions on the strain beams 130 where the strain grids 140 are provided are non-linear.

Therefore, in the torque-sensor strain beam structure 100, the transmission paths of the load transmitted from the load inputting points to the positions on the strain beams 130 where the strain grid 140 are provided are non-linear; therefore, the transmission lengths of the load transmitted from the load inputting points to the positions on the strain beams 130 where the strain grid 140 are provided are longer. Even if a small rotating load is applied at the load inputting points, a large amount of strain will take place on the positions of the strain beams 130 where the strain grids 140 are provided, thereby facilitating the strain grid 140 to collect strain information. Therefore, arrangement of the torque-sensor strain beam structure 100 described above enables the torque sensor to have a smaller volume while having a high detection sensitivity.

In some embodiments, a length of the strain beam 130 is greater than a width thereof. A thickness of the strain beam 130 is smaller than a thickness of the external ring 110 and a thickness of the connecting hub 120 respectively. The length of the strain beam 130 refers to a dimension of the strain beam 130 along an extending direction of the strain beam 130, the width of the strain beam 130 refers to a dimension of the strain beam 130 in the circumferential direction of the external ring 110, and a thickness of the strain beam 130 refers to a dimension of the strain beam 130 in a central axis direction of the external ring 110. A thickness of the connecting hub 120 and a thickness of the external ring 110 respectively refer to a dimension in a central axis direction of the external ring 110. Therefore, the strain beam 130 is a thin and long rod structure, so that a strain may easily take place on the strain beam 130, the measurement sensitivity of the torque sensor can be further improved.

Referring to FIG. 11 again, in some embodiments, the connecting hub 120 includes a connecting portion 122 and two acting portions 123. The connecting portion 122 is connected between the two acting portions 123, so that the connecting hub 120 has an elongated plate-like structure. The first joint 111 is located at an end of the acting portion 123 away from the connecting portion 122. A first end of the strain beam 130 is fixedly connected to a side wall of the connecting portion 122.

When there is one second joint 121, the second joint 121 is located on one of the acting portions 123. When there are multiple first joints 111, multiple second joints 121 may be located on any one of the acting portions 123, and they can also be divided into two groups, in which one of the two groups is located on one of the two acting portions 123 and another of the two groups is located on another of the two acting portions 123.

Therefore, when the load inputting point of the torque-sensor strain beam structure 100 is located at the second joint 121, the connecting hub 120 is configured as an elongated plate-shaped structure, and the second joint 121 is provided at an end of the acting portion 123 away from the connecting portion 122, which can further lengthen a transmission lengths of a load transmitted from the load inputting point to positions on the strain beams 130 where the strain grid 140 are provided, the measurement sensitivity of the torque sensor can be further improved.

Furthermore, in some embodiments, two opposite sides of the connecting portion 122 are both arc-shaped surfaces 1221 protruding outward. The second end of each strain beam 130 facing away from the inner wall of the external ring 110 is connected to a corresponding arc-shaped surface 1221. Specifically, the arc-shaped surface 1221 is a circular arc-shaped surface.

When the load inputting point of the torque-sensor strain beam structure 100 are located at the second joint 121, since side surfaces of the connecting portion 122 connected to the strain beam 130 are an arc-shaped surface 1221, transmission paths of a load transmitted from the second joint 121 to positions on the strain beam 130 where the strain grid 140 are provided are more tortuous, which further increases the transmission lengths of the load transmitted from the second joint 121 to the positions on the strain beam 130 where the strain grid 140 are provided, and the measurement sensitivity of the torque sensor is further improved.

In other embodiments, the connecting hub 120 may also be an annular plate-like structure or other plate-like structure. When the connecting hub 120 has an annular plate-like structure, the strain beam 130 is connected to an outer wall of the connecting hub 120. If there are multiple second joints 121, the multiple second joints 121 are arranged at intervals along a circumferential direction of the connecting hub 120.

The following Embodiment I and Embodiment II show the different structural forms of the strain beam 130 in the above embodiments, and the details are as follows.

Now, referring to FIG. 1 to FIG. 7, Embodiment I is described.

Each of the strain beams 130 includes a first strain plate 131 and a second strain plate 132 connected to one end of the first strain plate 131. An extending direction of the first strain plate 131 and an extending direction of the second strain plate 132 are intersected with each other. Therefore, the strain beam 130 is an elongated plate-like structure extending along a bend line. The strain grid 140 is disposed on a surface of the first strain plate 131 or a surface of the second strain plate 132. One of the first strain plate 131 and the second strain plate 132 is fixedly connected to the inner wall of the external ring 110, and another of the first strain plate 131 and the second strain plate 132 is fixedly connected to the connecting hub 120.

Therefore, the strain beam 130 is a plate-like structure extending along a meander-line direction. No matter a load inputting point of the torque-sensor strain beam structure 100 is located at the first joint 111 or the second joint 121, the strain beam 130 extending along a bend line direction can increase the transmission lengths of the load transmitted from the load inputting point to the positions on the strain beams 130 where the strain grids 140 are provided, thereby facilitating improvement of the measurement sensitivity of the torque sensor.

Furthermore, in one embodiment, a width of the first strain plate 131 is greater than a width of the second strain plate 132. The strain grid 140 is disposed on a surface of the second strain plate 132. Thus, the strain beam 130 has a plate-like structure whose width varies in a length direction of the strain beam. When a rotating load is loaded at the load inputting point, a strain may take place more easily on the second strain plate 132 with a smaller width, which further improves the measurement sensitivity of the torque sensor.

Referring to FIGS. 1, 2, 5 and 6 again, specially, there are two second strain plates 132, and the two second strain plates 132 are arranged in parallel and spaced apart. A strain grid 140 is provided on each of the second strain plates 132. An angle between an extending direction of the second strain plate 132 and the extending direction of the first strain plate 131 is greater than 0 degrees and less than 180 degrees.

Providing the two second strain plates 132 can not only reduce the width of each of the strain beams 130 while ensuring rigidity requirements of the strain beams 130, so as to further improve the measurement sensitivity of the torque sensor, but also increase the number of strain grids 140, in order to improve the measurement accuracy of the torque sensor.

More specifically, each of the second strain plates 132 is perpendicular to the first strain plate 131, so that the strain beam 130 is F-shaped.

Furthermore, in some embodiments, the first strain plate 131 extends in a non-linear direction in a plane perpendicular to the central axis of the external ring 110. Therefore, the first strain plate 131 is a plate-like structure extending in a bend line direction, which can increase the length of the strain beam 130 without increasing a volume of the torque-sensor strain beam structure 100, thereby further improving the measurement sensitivity of the torque sensor.

In some embodiments, the first strain plate 131 is a plate-like structure extending in a straight line direction.

Referring to FIG. 7 again, furthermore, in another embodiment, each of the second strain plates 132 includes a horizontal plate 1321 and two vertical plates 1322. A first end of the horizontal plate 1321 is connected to one of the two vertical plates 1322 and a second end of the horizontal plate 1321 is connected to another of the two vertical plates 1322. An extending direction of each of the vertical plates 1322 and an extending direction of the horizontal plate 1321 are intersected with each other. Specifically, the second strain plate 132 has a gantry shape. The first strain plate 131 is fixedly connected to a side of the horizontal plate 1321 facing away from the vertical plate 1322. A width of the horizontal plate 1321 is smaller than a width of the vertical plate 1322 and a width of the first strain plate 131 respectively. The strain grid 140 is disposed on a surface of the horizontal plate 1321.

Therefore, configuring the second strain plate 132 to include the horizontal plate 1321 and two vertical plates 1322 can ensure rigidity of the strain beam 130 during a torque measurement process. The width of the horizontal plate 1321 is set to be smaller than the width of the vertical plate 1322 and the width of the first strain plate 131 and the strain grid 140 is arranged on the horizontal plate 1321, so that the horizontal plate 1321 undergoes a strain more easily, to further improve the measurement sensitivity of the torque sensor.

Furthermore, the first strain plate 131 is located in a middle portion of the horizontal plate 1321. The strain grids 140 are provided respectively at portions of the horizontal plate 1321 located at both sides of the first strain plate 131. Providing the strain grid 140 at the portions of the horizontal plate 1321 located at both sides of the first strain plate 131 may increase the number of the strain grids 140, and make the strain beam 130 have a symmetrical structure to ensure the measurement accuracy of the torque sensor.

Figure 8:
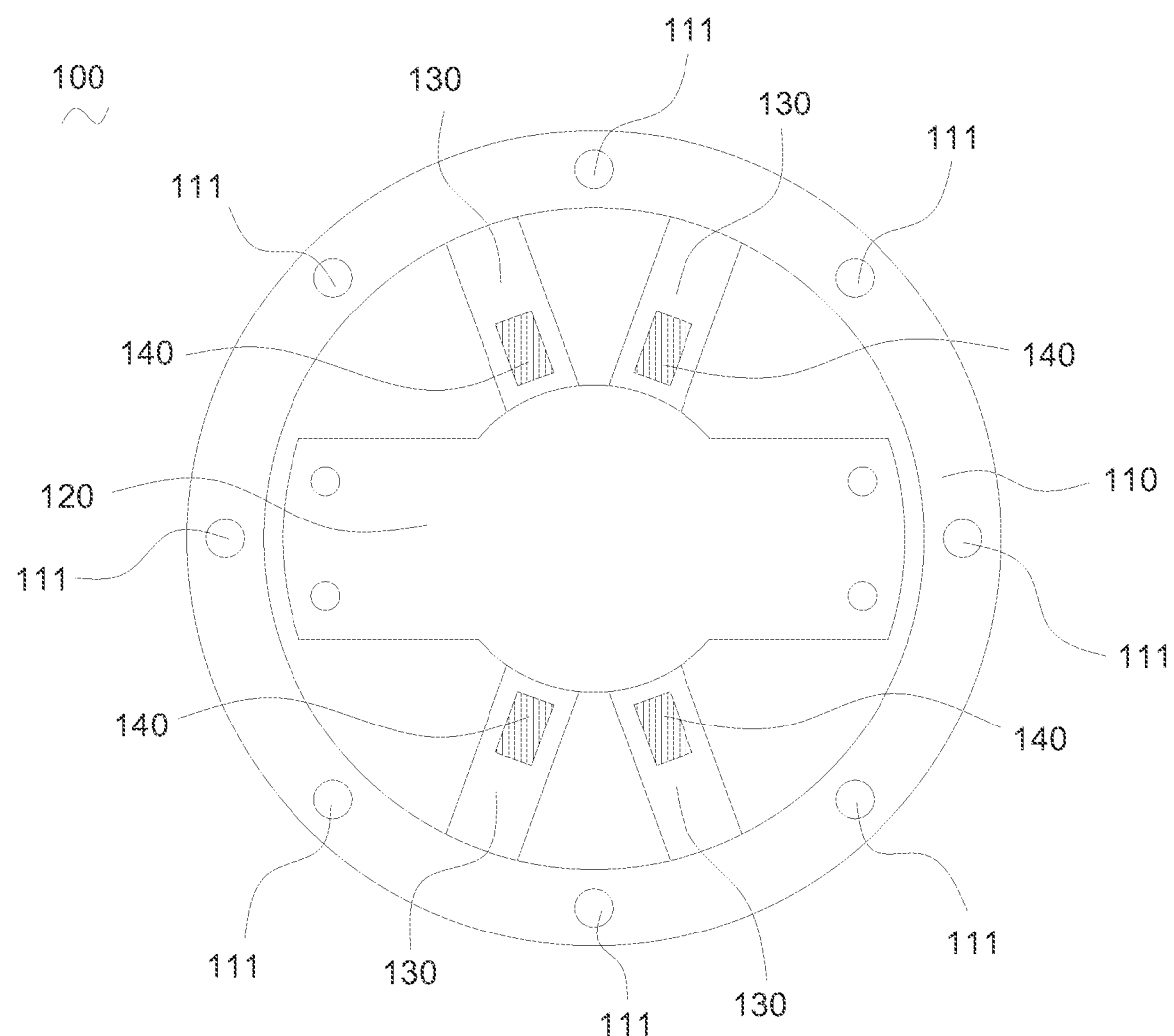
FIG. 8 is a structural schematic diagram of a torque-sensor strain beam structure according to Embodiment 8 of the present disclosure.
Figure 9:
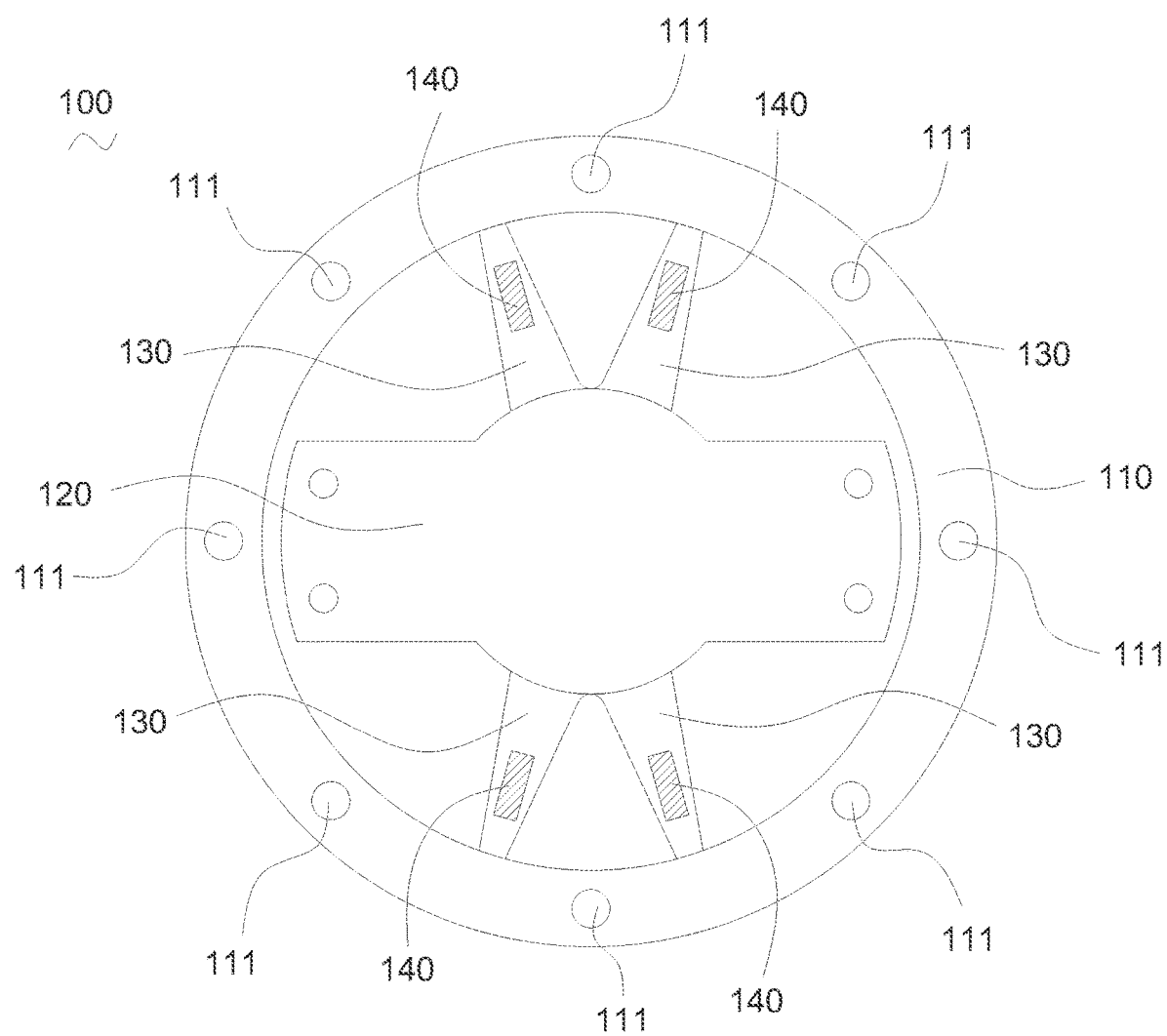
FIG. 9 is a structural schematic diagram of a torque-sensor strain beam structure according to Embodiment 9 of the present disclosure.

Now, referring to FIG. 8 and FIG. 9 again, Embodiment II is described.

The strain beam 130 is an elongated plate-liked structure. The first joint 111 is arranged in a staggered manner with respect to positions where the strain beams 130 are connected to the external ring 110. The second joint 121 is arranged in a staggered manner with respect to positions where the strain beams 130 are connected to the connecting hub 120. Therefore, during a torque measurement process, a strain may take place easily on the elongated plate-like strain beam 130, thereby facilitating collecting the strain information. Moreover, no matter the load inputting point is provided at the first joint 111 or the second joint 121, the transmission paths of the load transmitted from the load inputting point to the positions on the strain beams 130 where the strain grids 140 are provided are non-linear, which is more conducive to improvement of the measurement sensitivity of the torque sensor.

Furthermore, in some embodiments, the width of the strain beam 130 gradually decreases along a direction in which the connecting hub 120 points to the external ring 110. The strain grid 140 is disposed on a surface of one end of the strain beam 130 close to the external ring 110. In a torque detection process, a strain may take place more easily on an end of the strain beam 130 with a smaller width. Therefore, providing the strain grid 140 at the end of the strain beam 130 with a smaller width may further improve the measurement sensitivity of the torque sensor.

Figure 2:
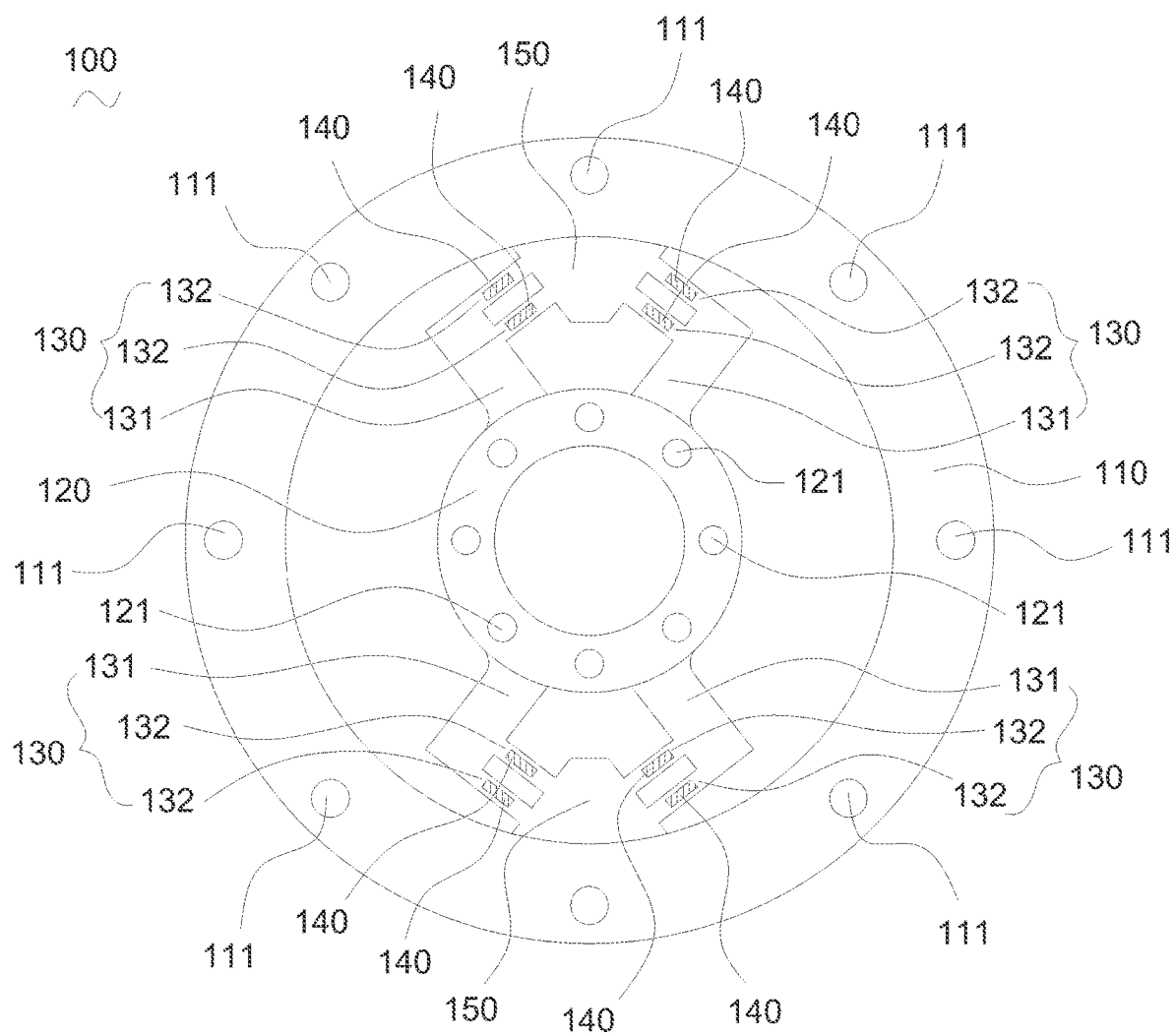
FIG. 2 is a structural schematic diagram of a torque-sensor strain beam structure according to Embodiment 2 of the present disclosure.
Figure 3:
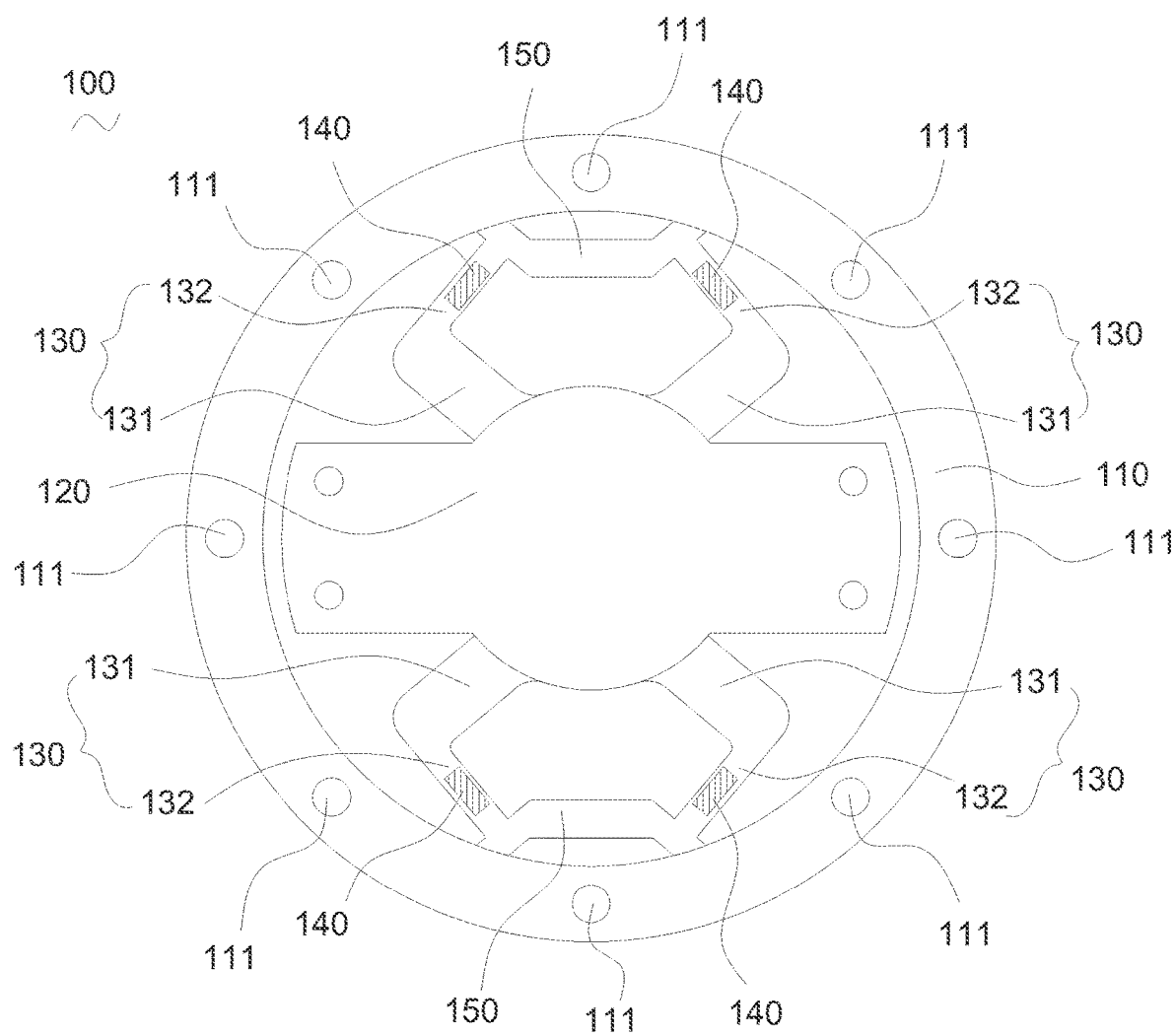
FIG. 3 is a structural schematic diagram of a torque-sensor strain beam structure according to Embodiment 3 of the present disclosure.
Figure 4:
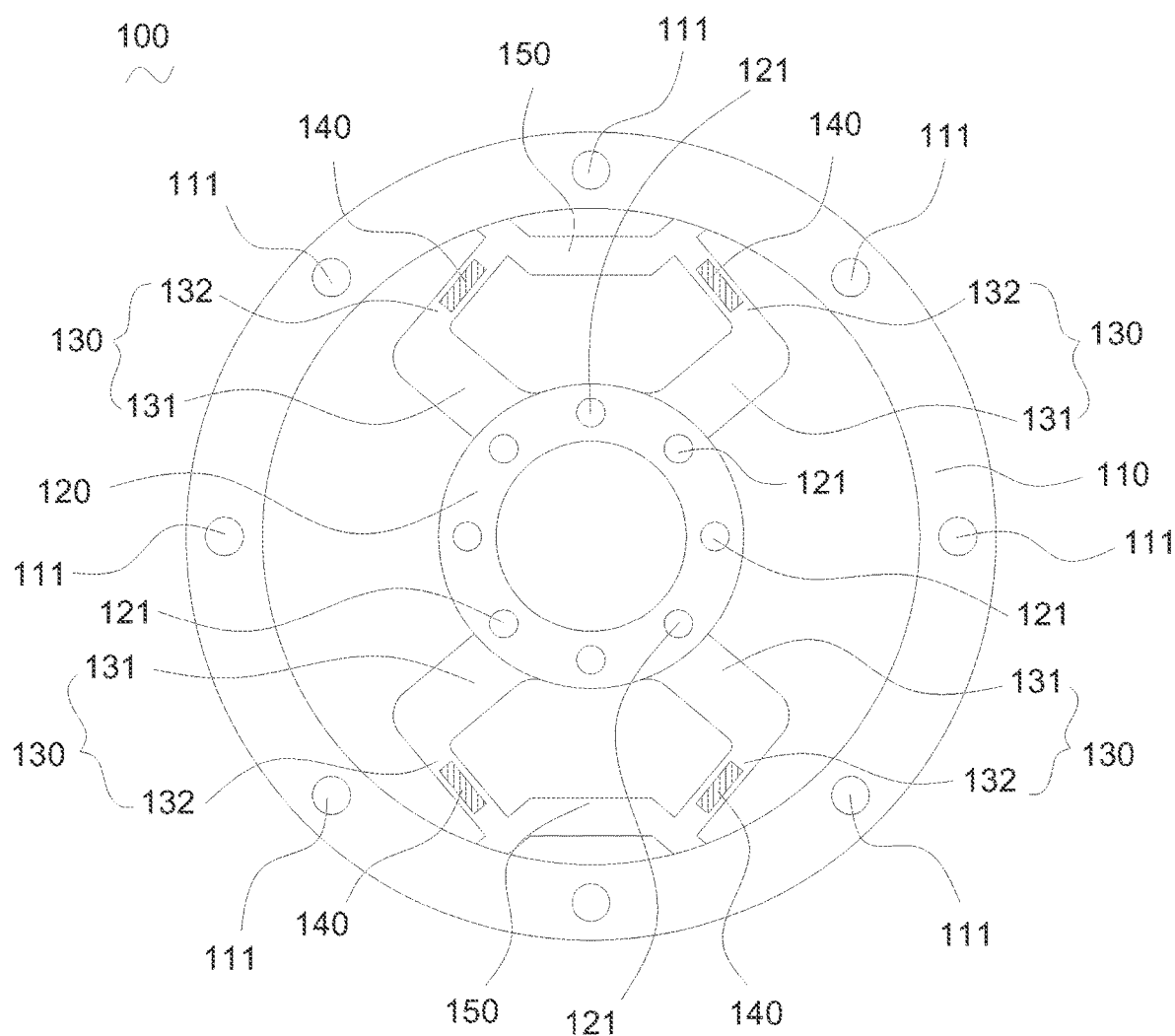
FIG. 4 is a structural schematic diagram of a torque-sensor strain beam structure according to Embodiment 4 of the present disclosure.
Figure 5:
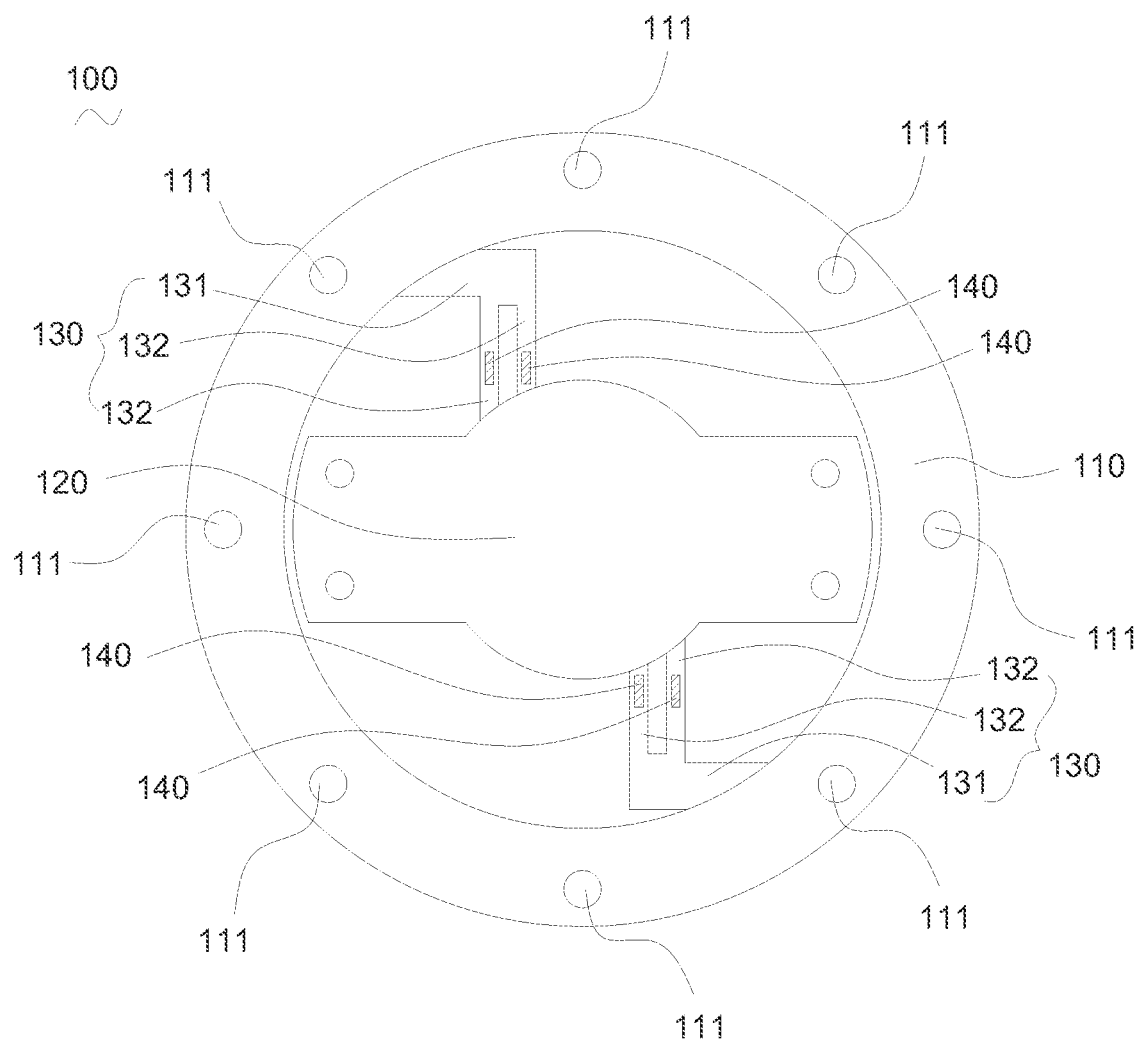
FIG. 5 is a structural schematic diagram of a torque-sensor strain beam structure according to Embodiment 5 of the present disclosure.
Figure 6:
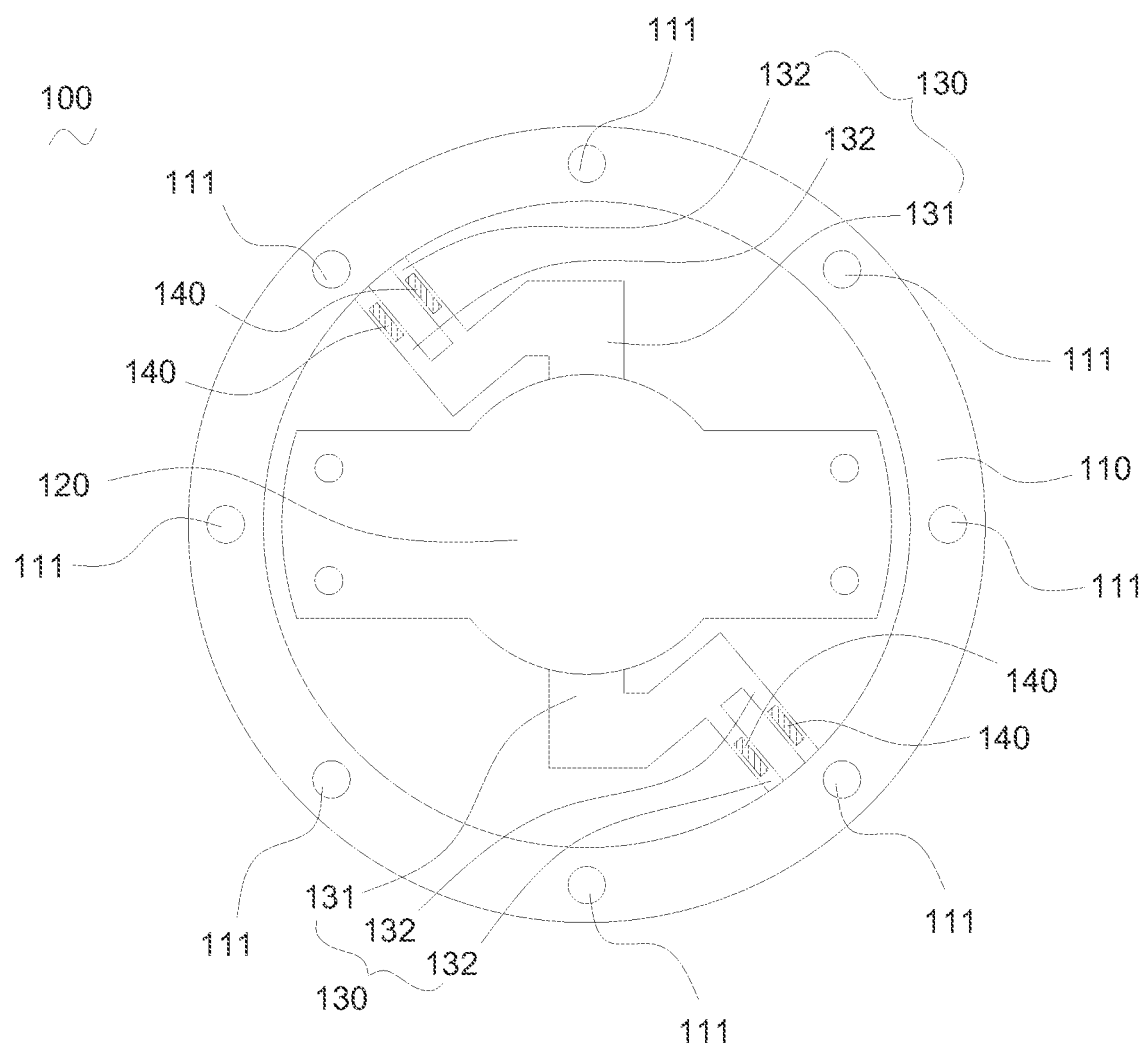
FIG. 6 is a structural schematic diagram of a torque-sensor strain beam structure according to Embodiment 6 of the present disclosure.
Figure 7:
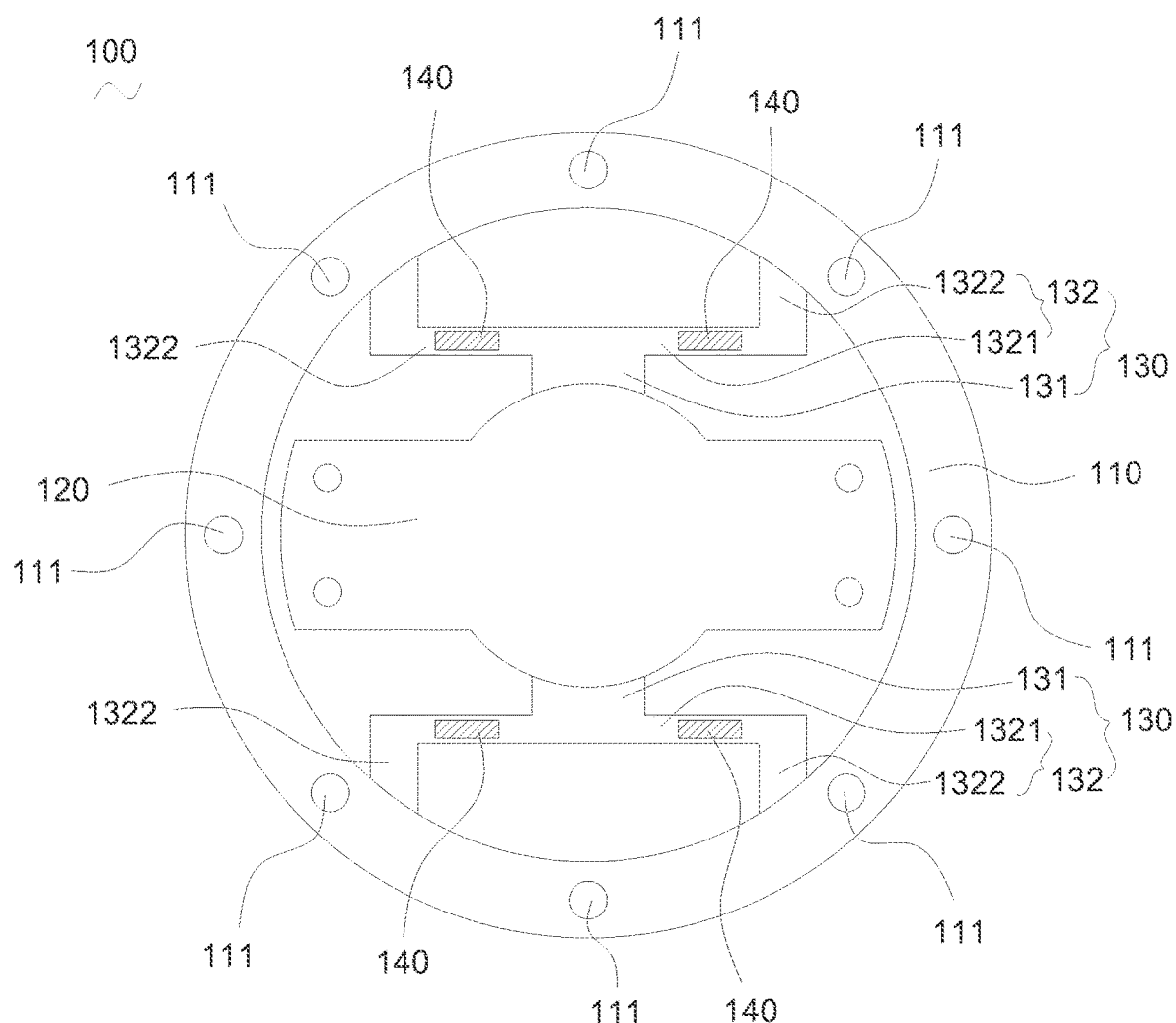
FIG. 7 is a structural schematic diagram of a torque-sensor strain beam structure according to Embodiment 7 of the present disclosure.

Referring to FIG. 1 to FIG. 4 again, in some embodiments, the torque-sensor strain beam structure 100 further includes transition plates 150 connected to the inner wall of the external ring 110. A width of the transition plate 150 gradually decreases along a direction in which the inner wall of the external ring 110 points to the connecting hub 120. A second end of the strain beam 130 is connected to an inclined surface of the transition plate 150.

It should be noted that the width of the transition plate 150 refers to a dimension of the transition plate 150 in the circumferential direction of the external ring 110. The inclined surface of the transition plate 150 is a surface of the transition plate 150 connected to the inner wall of the external ring 110; therefore, the transition plate 150 has a plate-like structure of trapezoidal or triangular shape. Therefore, when the load loading point of the torque-sensor strain beam structure 100 is located at the first joint 111, providing the transition plate 150 makes the transmission paths of the load transmitted from the first joint 111 to the positions on the strain beams 130 where the strain grid 140 are provided, more tortuous, which further increase the transmission lengths of the load transmitted from the load loading point to the positions on the strain beams 130 where the strain grids 140 are provided, and the measurement sensitivity of the torque sensor is further improved.

Furthermore, in some embodiments, the transition plate 150 is an elongated curved plate. Specifically, the transition plate 150 extends along a trapezoid-shaped bend line. Both ends of the transition plate 150 are fixedly connected to the inner wall of the external ring 110. The second end of the strain beam 130 is connected to a side surface of the transition plate 150.

When the load loading point is located at the first joint 111, the transition plate 150 configured as an elongated curved plate can further improve a tortuosity of the transmission paths of the load transmitted from the first joint 111 to the positions on the strain beams 130 where the strain grids 140 are arranged, so that, when a volume of the torque-sensor strain beam structure 100 is unchanged, the transmission lengths of the load transmitted from the first joint 111 to the positions on the strain beams 130 where the strain grids 140 are provided are longer, which further improves the measurement sensitivity of the torque sensor.

Figure 10:
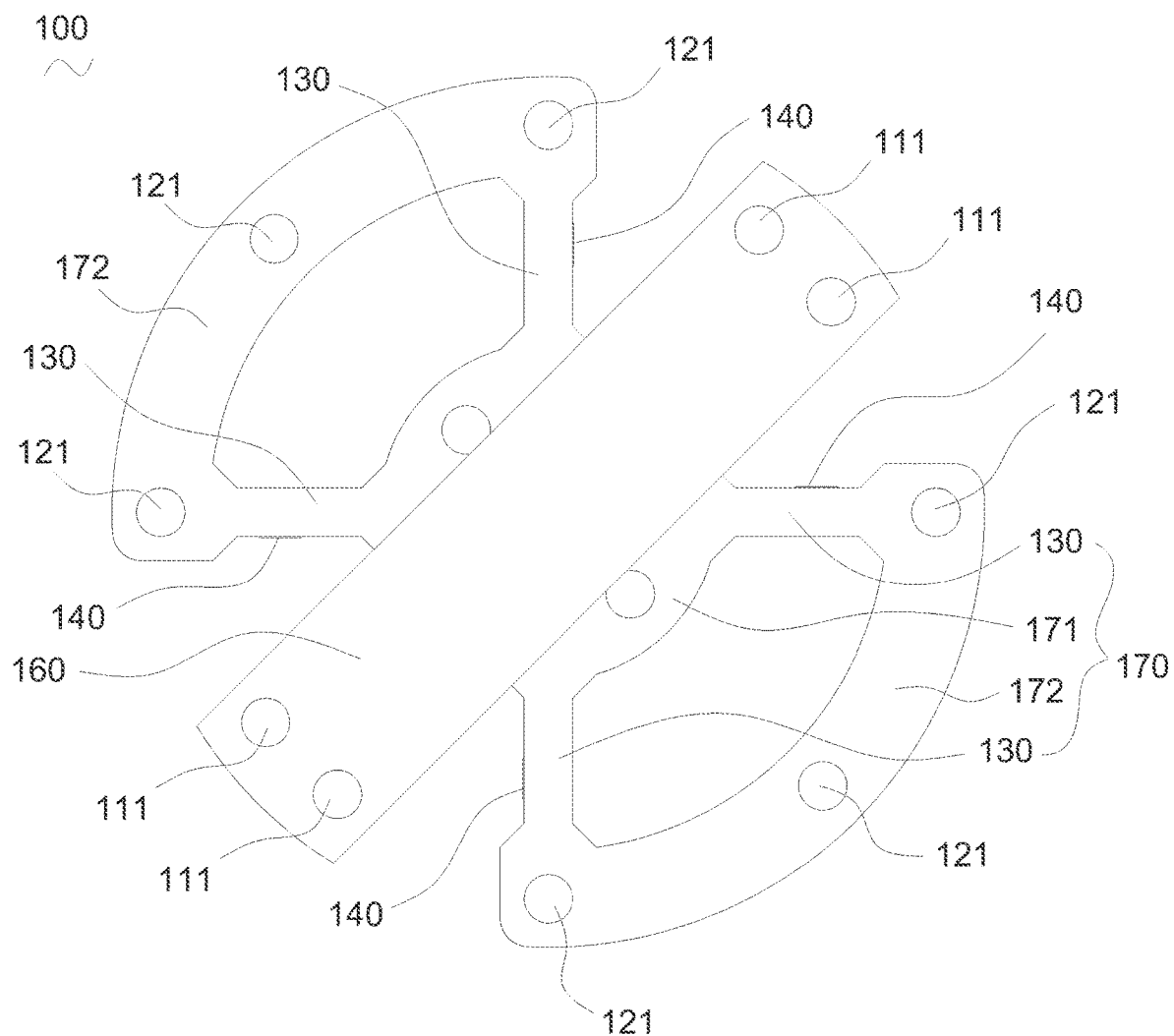
FIG. 10 is a structural schematic diagram of a torque-sensor strain beam structure according to Embodiment 10 of the present disclosure.

Referring to FIG. 10, the torque-sensor strain beam structure 100 in another preferred embodiment of the present disclosure includes a first connecting plate 160 and a second connecting plate 170 superposed on the first connecting plate 160.

An end of the first connecting plate 160 has a first joint 111. There may be one or more first joints 111. When there are multiple first joints 111, the multiple first joints 111 are arranged on the first connecting plate 160 at intervals.

The second connecting plate 170 includes a fixing plate 171, four strain beams 130, and two acting plates 172 opposite to and spaced apart from each other. The strain beams 130, the acting plates 172 and the fixing plate 171 are located in a same plane. The fixing plate 171 is located between the two acting plates 172. Each of the acting plates 172 is fixedly connected to the fixing plate 171 through two strain beams 130.

The four strain beams 130 are arranged symmetrically with respect to a geometric center of the fixing plate 171, so that the four strain beams 130 are arranged in an X shape. Therefore, the second connecting plate 170 is an X-shaped plate-like structure, and the two acting plates 172 are symmetrically arranged with respect to the fixing plate 171. Furthermore, the strain beam 130 can be fixedly connected to the fixing plate 171 and the acting plate 172 by welding or the like, or the strain beam 130 can be formed integrally with the fixing plate 171 and the acting plate 172.

The acting plate 172 has a second joint 121. Specifically, the acting plate 172 is an elongated arc-shaped plate. There may be one or more second joints 121. When there are multiple second joints 121, the multiple second joints 121 are arranged at intervals along an extending direction of the acting plate 172.

Furthermore, structures of the first joint 111 and the second joint 121 are the same as the first joint 111 and the second joint 121 of the torque-sensor strain beam structure 100 in the foregoing embodiments, for example, the first joint 111 and the second joint 121 may be a connecting hole or the like.

The fixing plate 171 is fixedly connected to the first connecting plate 160. Specifically, the first connecting plate 160 is a plate-like structure which is symmetric about a geometric center thereof, and the fixing plate 171 is fixedly connected to a middle portion of the first connecting plate 160.

A strain grid 140 is provided on a side surface of each of the strain beams 130. The strain grid 140 is used to detect strain information on the corresponding strain beam 130 in real time. The function, structure and forming technology of the strain grid 140 here are completely the same as those of the strain grid 140 in the torque-sensor strain beam structure 100 in the foregoing embodiments, and will not be described here.

It should be noted that the side surface of the strain beam 130 is a surface of the strain beam 130 parallel to a thickness direction of the first connecting plate 160.

Referring to FIG. 12*a*, FIG. 12*b*, FIG. 12*c* and FIG. 12*d* again, specifically, the cross section of the strain beam 130 is rectangular, T-shaped, H-shaped, or U-shaped. Furthermore, the cross section of the strain beam 130 is a cross section perpendicular to a length direction thereof. Configuring the cross section of the strain beam 130 to be rectangular, T-shaped, H-shaped or U-shaped is beneficial to concentration of stress on the strain beam 130.

In other embodiments, the cross section of the strain beam 130 can also be other shapes that are conducive to stress concentration.

Specifically, the strain grid 140 is a thin film strain grid 140 directly formed on a surface of the strain beam 130 by a vacuum ion beam sputtering technology. Regarding a method of forming the thin film strain grid 140 and beneficial effects that the thin film strain grid 140 can achieve, one may refer to the description of the thin film strain grid 140 in the foregoing embodiments.

The load inputting point of the torque-sensor strain beam structure 100 is located at the first joint 111. The transmission paths of the load transmitted from the first joint 111 to the positions on the strain beams 130 where the strain grids 140 are provided are non-linear.

Therefore, when the load inputting point of the torque-sensor strain beam structure 100 is located at the first joint 111, the second joint 121 is fixedly arranged. The transmission paths of the load transmitted from the first joint 111 to the positions on the strain beams 130 where the strain grids 140 are provided are tortuous, so that the transmission lengths of the load transmitted from the load inputting point to the positions on the strain beams 130 where the strain grid 140 are provided are longer, even if a small rotating load is applied at the first joint 111, a larger amount of strain may also take place at the positions of the strain beams 130 where the strain grids 140 are provided, thereby facilitating the strain grid 140 to collect the strain information. Therefore, the arrangement of the torque-sensor strain beam structure 100 described above enables the torque-sensor to have a smaller volume while having higher measurement sensitivity.

Furthermore, the strain grids 140 are arranged on the side surface of the strain beams 130, so that the strain grids 140 can detect the strain information on the strain beams 130 more easily, which further improves the measurement sensitivity of the torque sensor.

In some embodiments, the first connecting plate 160 is an elongated plate-like structure. The fixing plate 171 is fixedly connected to the middle portion of the first connecting plate 160. The extending direction of the first connecting plate 160 and the direction pointing from the fixing plate 171 to the acting plate 172 are intersected with each other. The first joint 111 is located at ends of the first connecting plate 160 away from the fixing plate 171.

Furthermore, an angle between the extending direction of the first connecting plate 160 and the direction pointing from the fixing plate 171 to the acting plate 172 is greater than 0 degrees and less than 180 degrees. The first connecting plate 160 is configured as an elongated plate-like structure, and the first joint 111 is arranged at the two ends of the first connecting plate 160, which further increases a tortuosity of the transmission paths of the load transmitted from the first joint 111 to the positions on the strain beams 130 where the strain grids 140 are provided, the measurement sensitivity of the torque sensor is further improved.

Furthermore, when there are multiple first joints 111, the multiple first joints 111 may all be arranged at one end of the first connecting plate 160, or may be divided into two groups; one of the two groups is arranged at one end of the first connecting plate 160, and the other one of the two groups is arranged at the other end of the first connecting plate 160.

In some embodiments, the thickness of the strain beams 130 is greater than the width of the strain beams. The strain grid 140 is provided on a surface of the strain beam 130 parallel to a thickness direction. It should be noted that the width direction of the strain beam 130 is consistent with a direction of the rotating load loaded at the first joint 111. Configuring the strain grid 140 to be on a surface parallel to the thickness direction can ensure that the strain beam 130 can have a large amount of strain at the strain grid 140, therefore, it is easier for the strain grid 140 to collect strain information, and the measurement sensitivity of the torque sensor is further improved.

In some embodiments, the first connecting plate 160 and the second connecting plate 170 are made of martensitic precipitation-hardening stainless steel, so as to improve fatigue and corrosion resistance of the first connecting plate 160 and the second connecting plate 170, the service lives of the first connecting plate 160 and the second connecting plate 170 are prolonged effectively, thereby prolonging the service life of the torque sensor.

Technical features of the above-mentioned embodiments can be combined arbitrarily. In order to make the description concise, all possible combinations of the various technical features in the above-mentioned embodiments are not described. However, as long as there is no contradiction in the combinations of these technical features, the combinations should be considered as being within the protection scope of this specification.

The above-mentioned embodiments only include several embodiments of the present disclosure, and the descriptions are relatively specific and detailed, but they should not be interpreted as limiting the scope of the present disclosure. It should be pointed out that for those skilled in the art, without departing from the concept of the present disclosure, several modifications and improvements can be made, and these all fall within the protection scope of the present disclosure. Therefore, the protection scope of the present disclosure should be dependent on the appended claims.

What is claimed is:

1. A torque-sensor strain beam structure comprising an annular external ring, a connecting hub configured symmetrically about a geometric center thereof, and at least two strain beams;
    wherein the external ring has a first joint;
    the connecting hub is located within the external ring and arranged coaxially with the external ring; the connecting hub has a second joint;
    a first end of each of the at least two strain beams is fixedly connected to an inner wall of the external ring and a second end of each of the at least two strain beams is fixedly connected to the connecting hub; the at least two strain beams comprise an even number of strain beams; the at least two strain beams are arranged symmetrically relative to a center of the external ring;
    a strain grid is provided on each of the at least two strain beams; the strain grid is configured to detect strain information on a corresponding strain beam where the strain grid is provided, and the strain grid is a thin film strain grid directly formed on a surface of each of the at least two strain beams by a vacuum ion beam sputtering technology;
    a load inputting point on the torque-sensor strain beam structure is located at the first joint or the second joint;
    when the load inputting point is located at the first joint, a transmission path of a load transmitted from the first joint to a position on each of the at least two strain beam where the strain grid is provided is non-linear;
    when the load inputting point is located at the second joint, a transmission path of a load from the second joint to the position on each of the at least two strain beam where the strain grid is provided is non-linear.

2. The torque-sensor strain beam structure according to claim 1, wherein a length of each of the at least two strain beams is greater than a width thereof; a thickness of each of the at least two strain beams is less than a thickness of the external ring and a thickness of the connecting hub, respectively.

3. The torque-sensor strain beam structure according to claim 1, wherein the connecting hub includes a connecting portion and two acting portions; the connecting portion is connected between the two acting portions, the connecting hub has an elongated plate-like structure; the second joint is located at ends of the two acting portions away from the connecting portion; the second end of each of the at least two strain beams is fixedly connected to a side wall of the connecting portion.

4. The torque-sensor strain beam structure according to claim 3, wherein two opposite sides of the connecting portion are both arc-shaped surfaces protruding outward; the second end of each of the at least two strain beams away from the inner wall of the external ring is connected to a corresponding arc-shaped surface.

5. The torque-sensor strain beam structure according to claim 1, wherein each of the at least two strain beams includes a first strain plate and a second strain plate connected to one end of the first strain plate; an extending direction of the first strain plate is intersected with an extending direction of the second strain plate; the strain grid is arranged on a surface of the first strain plate or a surface of the second strain plate;
    one of the first strain plate and the second strain plate is fixedly connected to the inner wall of the external ring, and another of the first strain plate and the second strain plate is fixedly connected to the connecting hub.

6. The torque-sensor strain beam structure according to claim 5, wherein a width of the first strain plate is greater than a width of the second strain plate; the strain grid is arranged on the surface of the second strain plate.

7. The torque-sensor strain beam structure according to claim 6, wherein there are two second strain plates, and the two second strain plates are arranged in parallel and spaced apart; each of the two second strain plates is provided with the strain grid; and/or the first strain plate extends along a non-linear direction in a plane perpendicular to a central axis of the external ring.

8. The torque-sensor strain beam structure according to claim 5, wherein each second strain plate comprises a horizontal plate and two vertical plates, and one of the two vertical plates is connected to a first end of the horizontal plate and another of the two vertical plates is connected to a second end of the horizontal plate; an extending direction of each of the two vertical plates is intersected with an extending direction of the horizontal plate; the first strain plate is fixedly connected with a side of the horizontal plate away from the two vertical plates; a width of the horizontal plate is smaller than a width of each of the two vertical plates and a width of the first strain plate; the strain grid is arranged on a surface of the horizontal plate.

9. The torque-sensor strain beam structure according to claim 8, wherein the first strain plate is located at a middle portion of the horizontal plate; the horizontal plate is provided with the strain grids at portions of the horizontal plate located at both sides of the first strain plate.

10. The torque-sensor strain beam structure according to claim 1, wherein each of the at least two strain beams is an elongated plate-like structure; the first joint is arranged in a staggered manner with respect to positions where the at least two strain beams are connected to the external ring; the second joint is arranged in a staggered manner with respect to positions where the at least two strain beams are connected to the connecting hub.

11. The torque-sensor strain beam structure according to claim 10, wherein the width of each of the at least two strain beams is decreased gradually along a direction in which the connecting hub points to the external ring; the strain grid is arranged on a surface of one end of each of the at least two strain beams close to the external ring.

12. The torque-sensor strain beam structure according to claim 1, wherein the torque-sensor strain beam structure further comprises a transition plate connected to the inner wall of the external ring; a width of the transition plate is gradually decreased along a direction in which the inner wall of the external ring points to the connecting hub; the first end of each of the at least two strain beams is connected with an inclined surface of the transition plate.

13. The torque-sensor strain beam structure according to claim 12, wherein the transition plate is an elongated curved plate; both ends of the transition plate are fixedly connected to the inner wall of the external ring; and the transition plate extends along a trapezoidal contour curve.

14. The torque-sensor strain beam structure according to claim 1, wherein a cross section of each of the at least two strain beams is rectangular, T-shaped, H-shaped or U-shaped; or the at least two strain beams are made of martensitic precipitation-hardening stainless steel.

15. A torque sensor comprising the torque-sensor strain beam structure according to claim 1.

16. A torque-sensor strain beam structure comprising a first connecting plate and a second connecting plate superposed on the first connecting plate; the first connecting plate has a first joint;

the second connecting plate comprises a fixing plate, four strain beams, and two opposite acting plates spaced apart; the strain beams, the acting plates, and the fixing plate are located in a same plane;

the fixing plate is located between the two acting plates; each of the two opposite acting plates is fixedly connected to the fixing plate through two corresponding strain beams; the four strain beams are arranged symmetrically relative to a geometric center of the fixing plate so as to configure the four strain beams in an X-shaped arrangement; the acting plates have a second joint;

the fixed plate is fixedly connected to the first connecting plate; a strain grid is provided on a side surface of each of the four strain beams; the strain grid is used to detect strain information on a corresponding strain beam in real time, and the strain grid is a thin film strain grid directly formed on a surface of each of the strain beams by a vacuum ion beam sputtering technology;

when a load inputting point on the torque-sensor strain beam structure is located at the first joint, a transmission path of a load transmitted from the first joint to a position on each of the four strain beam where the strain grid is provided is non-linear.

17. The torque-sensor strain beam structure according to claim 16, wherein the first connecting plate is an elongated plate-like structure; the fixing plate is fixedly connected to a middle portion of the first connecting plate; an extending direction of the first connecting plate is intersected with a direction in which the fixing plate points to the acting plates; the first joint is located at an end of the first connecting plate away from the fixing plate.

18. The torque-sensor strain beam structure according to claim 16, wherein a thickness of each of the four strain beams is greater than a width thereof; the strain grid is located on a surface of each of the four strain beams parallel to a thickness direction of the strain beam; or a cross section of each of the four strain beams perpendicular to a length direction of the strain beam is rectangular, T-shaped, H-shaped or U-shaped; or the first connecting plate and the second connecting plate are made of martensitic precipitation-hardening stainless steel.

19. A torque sensor comprising the torque-sensor strain beam structure according to claim 16.

20. The torque sensor according to claim 19, wherein the first connecting plate is an elongated plate-like structure; the fixing plate is fixedly connected to a middle portion of the first connecting plate; an extending direction of the first connecting plate is intersected with a direction in which the fixing plate points to the acting plates; the first joint is located at an end of the first connecting plate away from the fixing plate.

* * * * *